Nov. 24, 1931.  O. S. CAESAR  1,833,067
HEATING APPARATUS FOR AUTOMOTIVE VEHICLES
Filed Feb. 7, 1927
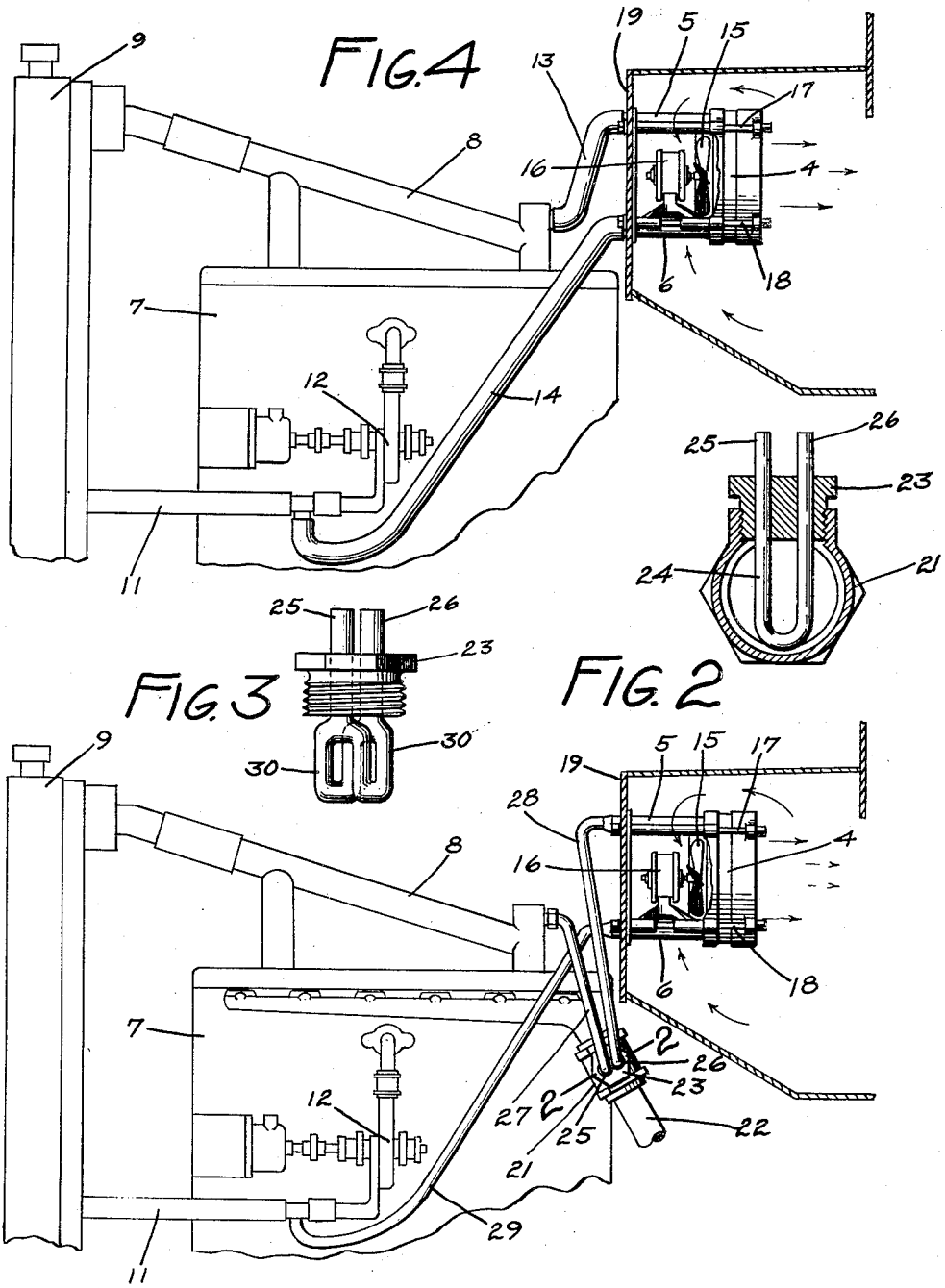
INVENTOR
ORVILLE S. CAESAR
ATTORNEYS Patented Nov. 24, 1931

1,833,067

UNITED STATES PATENT OFFICE

ORVILLE S. CAESAR, OF MINNEAPOLIS, MINNESOTA, ASSIGNOR TO TROPIC-AIRE, INCORPORATED, OF MINNEAPOLIS, MINNESOTA, A CORPORATION OF DELAWARE

HEATING APPARATUS FOR AUTOMOTIVE VEHICLES

Application filed February 7, 1927. Serial No. 166,545.

This invention relates to new and useful improvements in apparatus for heating the interiors of automotive vehicles such, for instance, as sedans, buses, and the like, and is an improvement over the form shown in my co-pending application, Serial #166,544 filed February 7, 1927, now Patent No. 1,668,490 dated May 1, 1928.

An object of the present invention is to provide a heating apparatus for automotive vehicles, comprising a hot water air-heating member adapted to be mounted within a vehicle body for heating and circulating the air therein, and said member having an intake connecting it with the upper portion of the water-jacket of a vehicle engine and having a discharge connecting it with the intake to the water-jacket ahead of the usual engine water-circulating pump, whereby the water pump will establish a forced circulation of hot water through the heating member when the engine is functioning.

A further object is to provide such a heating apparatus having means interposed in the intake thereof for super-heating the water delivered thereto.

The particular object of the invention therefore, is to provide an improved heating apparatus for automotive vehicles.

Other objects of the invention will appear from the following description and accompanying drawings and will be pointed out in the annexed claim.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification;

Figure 1 is a side elevation of a portion of an internal combustion engine, showing the improved heating member connected with the water-circulating system thereof and the means provided for superheating the water delivered thereto;

Figure 2 is an enlarged detailed sectional view on the line 2—2 of Figure 1;

Figure 3 is a view showing a modified form of super-heater; and

Figure 4 is a view similar to Figure 1, but without the super-heater.

The general construction of the heating member shown in this application is similar to the one shown and described in the above mentioned pending application and it is therefore, thought unnecessary to describe same in detail.

This heating member comprises a casing 4 having intake and discharge connections 5 and 6 respectively, for connecting it to the water-circulating system of the engine 7. The engine is provided with the usual water-jacket having a water discharge or outlet manifold 8 connecting the upper portion thereof with the usual water-cooling radiator 9, and having an intake connection 11 at its lower portion, similarly connecting it with the radiator 9. The usual pump 12 is shown interposed in the connection 11 for establishing a forced circulation in the water-cooling system.

An important feature of this invention resides in the means provided for super-heating the water delivered to the heating member 4. Such means is clearly shown in Figure 2, and consists of a coupling or fitting 21 interposed in the exhaust pipe 22 adjacent the vehicle engine, as shown in Figure 1. This fitting has a threaded plug 23 mounted therein in which a U-shaped member 24 is secured. This U-shaped member traverses the fitting 21 and is subjected to the heat of the exhaust gases flowing through the exhaust pipe 22. The terminals 25 and 26 are connected respectively to the conduits 27 and 28 as shown in Figure 1. The conduit 27 has one end connected to the discharge manifold 8 of the engine water-jacket and the conduit 28 has one end connected with the intake pipe 5 of the heating member. Thus, it will be seen that when the engine is functioning, water will be circulated through the conduits 27, U-shaped member 24, conduit 28, through the heating member 4, and thence through the discharge conduit 29, back to the intake 11 of the engine water-jacket. The U-shaped member 24 functions as a superheater for increasing the temperature of the water delivered to the heating member 4, thereby increasing the efficiency thereof.

A small fan 15 is mounted back of the casing 4 of the heating member and is operable by a small motor 16 suitably supported upon rods or bolts 17 and 18, securing the heating member to the dash 19 of the vehicle. This motor is connected to a suitable source of electric energy, such as the usual storage battery of the vehicle and has a rheostat interposed in its circuit for regulating the speed of the fan 15. The rheostat is mounted within convenient reach of the driver of the vehicle so that he may regulate the speed of the fan to vary the velocity of the air circulating through the heating member and therefore throughout the interior of the vehicle body.

Figure 3 illustrates a modified form of superheater wherein a plurality of U-shaped tubes or members 30 are mounted in the threaded plug 23 in place of the U-shaped member 24, shown in Figure 2. The members 30 communicate with the terminals 25 and 26. This form of super-heater presents a greater heating surface to the water flowing therethrough.

Figure 4 illustrates a modified form wherein the intake 5 of the heating member 4 has a conduit 13 connecting it with the discharge 8 of the engine water-jacket, and a conduit 14 connects the discharge 6 of the heating member with the intake connection 11 of the engine. It will be noted that the conduit 14 is connected to the intake 11 of the engine water-jacket ahead of the pump 12, thereby causing a forced circulation of the cooling medium through the heating member, simultaneously as the cooling medium is circulated through the water-jacket and the radiator 9 of the engine.

In operation, water will continuously circulate through the heating member 4 but, when the rotation of the fan 15 is interrupted or stopped, substantially no heat will be radiated or circulated within the vehicle body. When it is desired to heat or warm the air within the vehicle body, the fan 15 will be started, thereby causing the air within the vehicle body to be circulated through the heating member, and therefore throughout the interior of the vehicle. As the speed of the fan is increased, the velocity of the air flowing through the heating-member will likewise be increased, thereby causing all of the air within the vehicle body to be continuously circulated through the heating member with the resultant heating or warming thereof to the desired temperature. By superheating the water delivered to the heating member, as above described, a comfortable temperature may be maintained in the vehicle in extremely cold weather, even when the engine is operating at slow speed and the water in the cooling system thereof is not extremely warm.

I claim as my invention;

The combination with an automotive vehicle having an internal combustion engine including a water jacket and an exhaust manifold, and a vehicle body at the rear of the engine and closed against entrance of gases therefrom, of a heater located within the vehicle body and provided with a fan for forcing air therethrough, a cooling radiator in front of the engine, a water circulating system including the cooling radiator and the engine water jacket, a second water circulating system including the heater in the vehicle body and the engine water jacket, a pump common to both water circulating systems for causing water to be circulated simultaneously through the heater in the vehicle body and through the cooling radiator, and means between the engine water jacket and the heater within the vehicle body and associated with the exhaust manifold of said engine for heating the water as it passes from said water jacket to said heater.

In witness whereof, I have hereunto set my hand this 4th day of February, 1927.

ORVILLE S. CAESAR.